(12) United States Patent
Ellender et al.

(10) Patent No.: US 7,447,599 B2
(45) Date of Patent: Nov. 4, 2008

(54) METHOD AND SYSTEM FOR GENERATING AN UNCERTAINTY VALUE

(75) Inventors: Damon J. Ellender, Tomball, TX (US); Duane B. Toavs, Taylor, TX (US); Randy R. Page, Cypress, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 186 days.

(21) Appl. No.: 11/419,661

(22) Filed: May 22, 2006

(65) Prior Publication Data

US 2007/0271043 A1     Nov. 22, 2007

(51) Int. Cl.
*G01F 1/34* (2006.01)
*G06F 17/40* (2006.01)

(52) U.S. Cl. ............... 702/50; 702/45; 73/861.42; 73/861.03

(58) Field of Classification Search ............... 702/50, 702/45, 54, 55
See application file for complete search history.

(56) References Cited

U.S. PATENT DOCUMENTS

| | | | |
|---|---|---|---|
| 4,534,216 A | 8/1985 | Fasano et al. | |
| 5,753,827 A | 5/1998 | Cage | |
| 6,158,288 A * | 12/2000 | Smith | 73/861.25 |
| 6,622,574 B2 * | 9/2003 | Fincke | 73/861.63 |
| 6,721,674 B2 * | 4/2004 | Borzsonyi | 702/100 |
| 2004/0206189 A1 * | 10/2004 | Henry et al. | 73/861.356 |
| 2004/0216509 A1 * | 11/2004 | Antonijevic | 73/1.16 |
| 2004/0260526 A1 | 12/2004 | Hall et al. | |

OTHER PUBLICATIONS

PCT Search Report for Application No. PCT/US07/69364, dated Feb. 28, 2008.

* cited by examiner

*Primary Examiner*—Hal D Wachsman
(74) *Attorney, Agent, or Firm*—Conley Rose, P.C.; Mark E. Scott

(57) ABSTRACT

A method and system for generating an uncertainty value. At least some of the illustrative embodiments are systems comprising a device in fluid communication with a conduit, and a flow computer electrically coupled to the device. The flow computer is configured to generate a flow value based on parametric data, and the flow computer is configured to generate an uncertainty value of the flow value based on the parametric data and on an accuracy value received from the device.

18 Claims, 6 Drawing Sheets

US 7,447,599 B2

METHOD AND SYSTEM FOR GENERATING AN UNCERTAINTY VALUE

BACKGROUND

Measurements of mass and volume flow rates of fluid through a conduit are a part of operations in the oil and gas industry. When the ownership of fluid changes hands (custody transfer), a high integrity system that provides reliable flow data with minimal uncertainty is desirable.

Flow meters such as ultrasonic, turbine, and coriolis provide parametric data such as volume flow rate, flow velocity, and mass flow rate, while temperature, pressure, and differential pressure transmitters measure parametric data such as fluid temperature, differential pressure across an orifice, and static pressure. The parametric data may be used to derive a number of flow variables such as discharge coefficient, expansion factor, and fluid density and viscosity. Also, the parametric data may be used in a flow calculation equation to determine the fluid flow rate (if not determined directly by virtue of the meter used) and the total flow volume.

While such measurements and flow rate calculations have inherent inaccuracies, the precise measurement of fluid properties is necessitated in order to avoid improperly charging for the transfer of fluid. Currently, static error calculations are performed in an attempt to quantify the uncertainty in measurement. However, static error calculations are based on worse case scenarios, and the delay in such calculations lessens their usefulness.

SUMMARY

The problems noted above are solved in large part by a method and system for generating an uncertainty value. At least some of the illustrative embodiments are systems comprising a device in fluid communication with a conduit (wherein the device is configured to collect parametric data regarding fluid flow through a conduit, and wherein the device is configured to generate an accuracy value of the parametric data), and a flow computer electrically coupled to the device (wherein the flow computer is configured to receive the parametric data and the accuracy value from the device). The flow computer is configured to generate a flow value based on the parametric data, and the flow computer is configured to generate an uncertainty value of the flow value based on the parametric data and on the accuracy value received from the device.

Other illustrative embodiments are methods comprising collecting parametric data indicative of fluid flow within a conduit generating an accuracy value indicative of the measurement accuracy of the parametric data, computing a flow value based on the parametric data, and computing a value indicative of the uncertainty of the flow value, the computing based on the parametric data and the accuracy value.

Yet still other illustrative embodiments are flow computers comprising a processor, a memory electrically coupled to the processor, and a communications port electrically coupled to the processor (the communications port configured to receive parametric data indicative of fluid flow and a value indicative of the accuracy of the parametric data). The processor is configured to generate a flow value based on the parametric data, and wherein the processor is configured to generate an uncertainty value of the flow value based on the parametric data and on the value indicative of the accuracy.

Other illustrative embodiments are systems comprising a device in fluid communication with a conduit (the device configured to collect parametric data regarding fluid flow through the conduit, and the device configured to generate an accuracy value of the parametric data). The device is configured to generate a flow value based on the parametric data, and the device is configured to generate an uncertainty value of the flow value based on the parametric data and on the accuracy value.

The disclosed devices and methods comprise a combination of features and advantages which enable it to overcome the deficiencies of the prior art devices The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the term "comprises" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

For the purposes of this application, the term "real-time" encompasses the delays associated with the collection of data as well as the delays associated with the subsequent processing and reporting of the data. Thus, "real-time" data may be contemporaneously reported as it is gathered and/or calculated, and its real-time status shall not be negated by collection and/or processing delays.

DETAILED DESCRIPTION OF THE PREFERRED EMBODIMENTS

Figure 1:
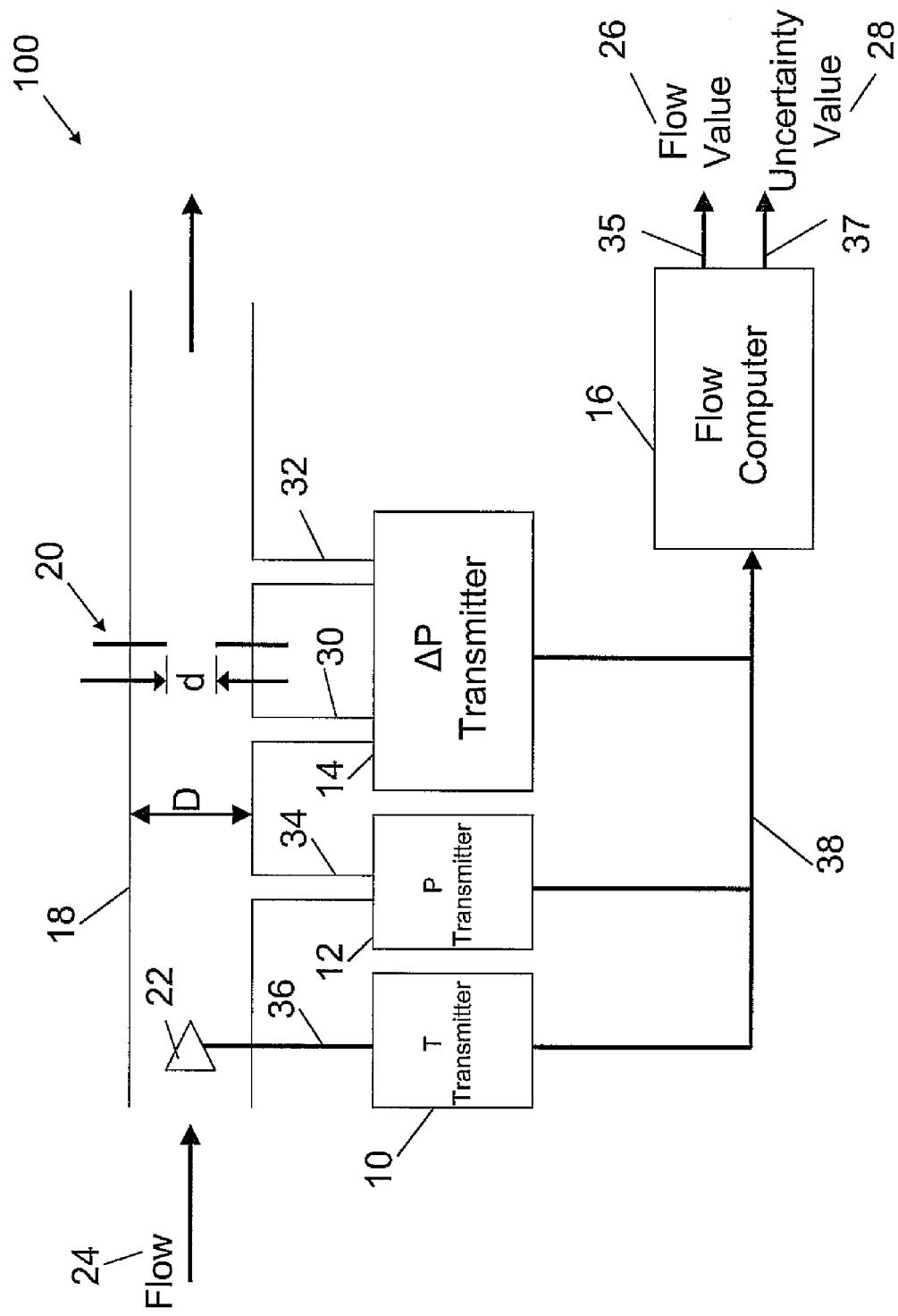
FIG. 1 illustrates a system in accordance with embodiments of the invention utilizing a transmitter and a flow computer.

FIG. 1 illustrates a flow measurement system 100 for measuring a fluid flow value 26 and generating a value indicative of the uncertainty of the flow value 26, termed herein an uncertainty value 28. The flow measurement system 100 comprises an orifice plate 20 having an orifice diameter "d" disposed within a conduit 18 having a diameter "D". The orifice plate 20 may be of varying types (e.g., concentric, eccentric, and segmental). Furthermore, the orifice plate 20 is oriented substantially perpendicular to a fluid flow 24 through the conduit 18. As the flow 24 passes through the orifice plate 20, there is a resultant drop in fluid pressure and a corresponding increase in fluid velocity. In the embodiments of FIG. 1, the difference in pressure on opposing sides of the orifice plate 20 is measured by a differential pressure transmitter 14 that is in fluid communication with the conduit 18 through taps or inlets 30 and 32. The differential pressure transmitter 14 is further electrically coupled to a flow computer 16 by way of a conductor 38.

FIG. 1 further illustrates a pressure transmitter 12 upstream of the orifice plate 20 that is in fluid communication with the conduit 18 through a tap or inlet 34. The pressure transmitter 12 measures the pressure upstream of the orifice plate 20, and the pressure transmitter is electrically coupled to the flow computer 16 by way of the conductor 3 8. A temperature transmitter 10 has a temperature sensor 22 disposed within the fluid flow 24, and the temperature transmitter 10 electrically couples to the sensor 22 by way of a conductor 36. The temperature sensor 22 measures the fluid temperature upstream of the orifice plate 20. The temperature transmitter 10 is also coupled to the flow computer 16 by way of the conductor 38. In alternative embodiments, the differential pressure transmitter 14, pressure transmitter 12, and temperature transmitter 10 couple to the flow computer 16 by way of individual conductors, or by way of a wireless communications system.

The transmitters employed in the flow measurement system 100 provide real-time parametric data such as fluid temperature, differential pressure, and static pressure. The parametric data may be used in a flow calculation equation to determine a real-time fluid flow rate. Additionally, the parametric data may also be used to derive a number of flow variables on a real-time basis (e.g., discharge coefficient, expansion factor, and fluid density and viscosity). In alternative embodiments, the transmitters provide real-time statistical data to the flow computer (e.g., arithmetic mean of a process variable, standard deviation, number of samples, and collection period).

In the embodiments illustrated in FIG. 1, the various transmitters are microprocessor-based devices that, in addition to the parametric data collection, also generate accuracy values associated with their parametric data. For the embodiments herein disclosed, accuracy refers to the ability of a device such as a transmitter to measure parametric data that conforms to the real values of the fluid flow variables being measured. Devices may exhibit excellent accuracy that meets or possibly exceeds manufacturer's specifications in some operational conditions. However, in other operational conditions the device may be subject to fluctuating ambient temperatures or high static line pressure and may even drift out of calibration. Thus, the real-time accuracy value generated, and associated with the parametric data, provides useful information regarding the integrity of the parametric data and of the transmitter.

The flow computer 16 as illustrated in FIG. 1 receives the real-time parametric data and accuracy values associated with the parametric data from the temperature transmitter 10, pressure transmitter 12, and differential pressure transmitter 14 by way of the conductor 38. In alternative embodiments, the flow computer 16 provides data or commands to the transmitters, or in response to the data it receives from the transmitters. Moreover, the flow computer 16 generates the real-time flow value 26 and the real-time uncertainty value 28. The uncertainty calculation in the flow computer 16 provides a real-time uncertainty that can be used to determine the accuracy of the entire custody transfer meter run and as a diagnostic tool to isolate device problems. Significant shifts in the calculated uncertainty value 28 indicate a system change from some initially calibrated condition. The uncertainty value 28 could also be archived or trended over time, and an alarm generated if the uncertainty value 28 goes beyond some user-defined setpoint. Regardless of the type of transmitter or flow meter employed, in some embodiments the real-time uncertainty calculation performed in the flow computer 16 utilizes static equations such as those defined by flow measurement standards such as AGA 3, API NPMS Chapter 14 Section 3 Part 1, ISO 5167 for orifice flow meters, or ISO 5168 for total system uncertainty, except the flow computer 16 uses the equations in real-time with real-time parametric data and accuracy values to calculate the real-time flow value 26 and the real-time uncertainty value 28. In particular, in some embodiments the total uncertainty may be defined by the following equation:

$$U^2 = \sum_{i=1}^{n} u_i^2 S_i^2 \qquad (1)$$

where U is the total uncertainty, u is an uncertainty component herein called the accuracy value for the transmitter i, and S is the sensitivity coefficient for each accuracy value. For example, the effect the accuracy of the differential pressure measurement has on the total uncertainty is greater than the effect of the accuracy of the temperature measurement, and those greater and/or lesser effects are accounted for using the sensitivity coefficient.

Figure 2:
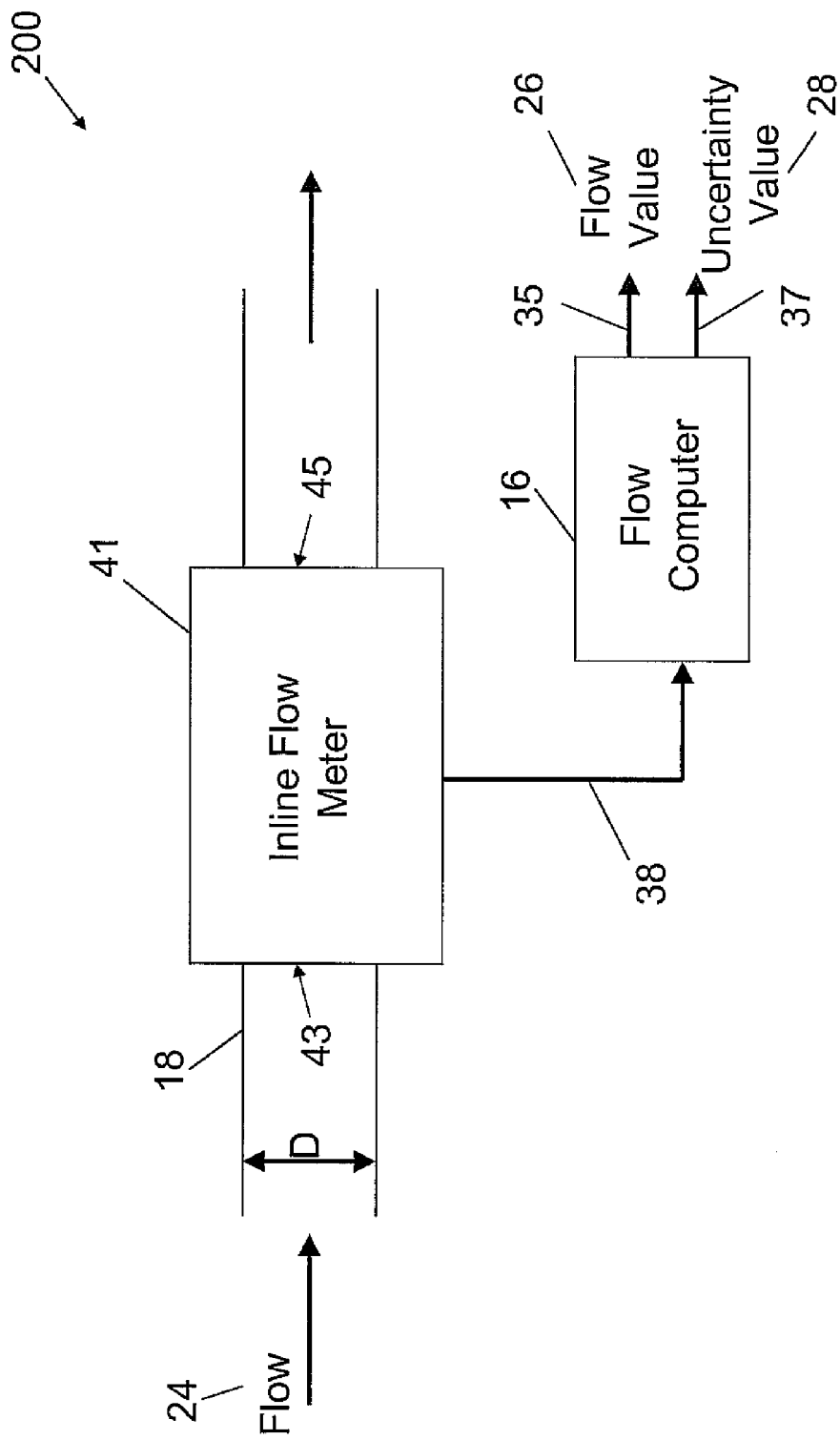
FIG. 2 illustrates a system in accordance with embodiments of the invention utilizing an inline flow meter and a flow computer.

FIG. 2 illustrates a flow measurement system 200 in accordance with alternative embodiments. The orifice plate 20, temperature transmitter 10, pressure transmitter 12, and differential pressure transmitter 14 have been removed in favor of an inline flow meter 41. The inline flow meter 41 may comprise a coriolis meter, an ultrasonic meter, or a turbine meter, among others. The inline flow meter 41 is positioned such that the fluid flow in the conduit 18 flows through the inline flow meter 41. The inline flow meter 41 collects parametric data such as volume flow rate, flow velocity, and mass flow rate and also generates accuracy values associated with the parametric data collected. In some embodiments, the inline flow meter 41 also provides real-time statistical data (e.g., arithmetic mean of a process variable, standard deviation, number of samples, and collection period). The inline flow meter 41 is also coupled to the flow computer 16 by way of the conductor 38.

The flow computer 16 receives the parametric data and associated accuracy values from the inline flow meter 41 by way of the conductor 38. In alternative embodiments, the flow computer 16 provides data or commands to the inline flow meter 41, or in response to the data it receives from the inline flow meter 41. In accordance with embodiments of the invention, the flow computer 16 uses real-time parametric data and real-time accuracy values to calculate the real-time flow value 26 and the real-time uncertainty value 28.

Figure 3:
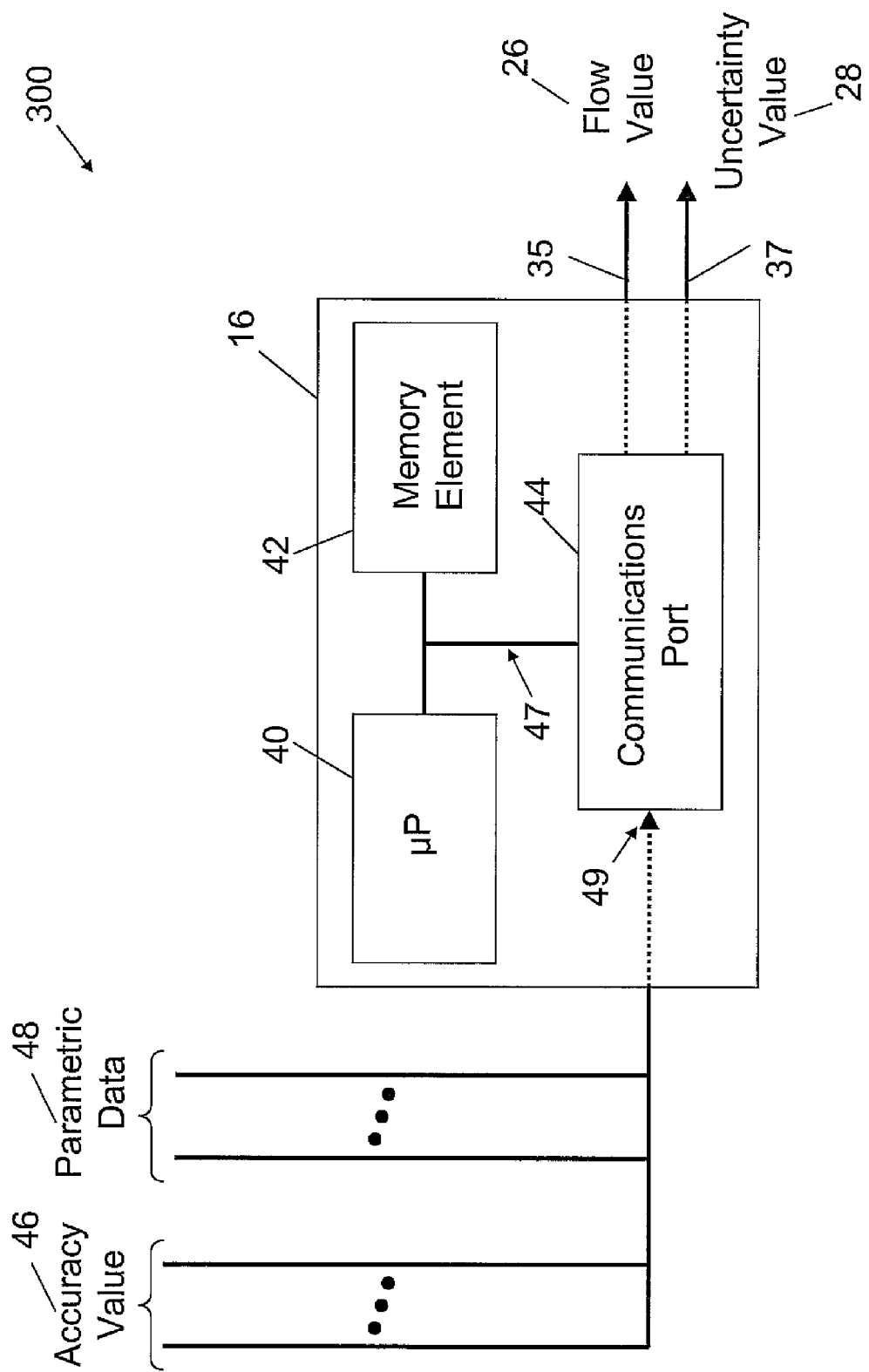
FIG. 3 illustrates a computer system in accordance with embodiments of the invention.

FIG. 3 provides a more detailed illustration of the flow computer 16. The flow computer 16 comprises a microprocessor 40, a memory element 42, a communications port 44, and a system bus 47. The system bus 47 electrically couples the microprocessor 40, the memory element 42, and the communications port 44. The memory element 42 comprises any type of removable or non-removable memory device or computer-readable media such as random-access memory (RAM), read-only memory (ROM), or flash memory. The memory element 42 may also comprise mass storage memory devices such as floppy disks, hard disks, optical disks, magnetic storage devices, or universal serial bus (USB) devices. The memory element 42 may further comprise storage devices accessed remotely, such as by way of an Ethernet or wireless network. Moreover, the memory element 42 stores computer-executable instructions that when executed by the microprocessor 40 generates the flow value 26 and the uncertainty value 28. Additionally, the memory element may store any previously generated flow value 26 and uncertainty value 28 for a variety of purposes such as archiving and trending over time. The communications port 44 comprises analog or digital input/output (I/O) devices or I/O controllers such as modems, wired or wireless network cards, serial and parallel ports, USB ports, and ports in compliance with standards such as EIA-232D, EIA-232, and EIA-422/485.

The flow computer 16 receives, from a plurality of sources, parametric data 48 and associated accuracy values 46. Specifically, the parametric data 48 and the accuracy values 46 are directed to the communications port 44 as indicated by arrow 49. The microprocessor 40, in electrical communication with the memory element 42 and the communications port 44 by way of the system bus 47, utilizes the parametric data 48 and the accuracy values 46 in the execution of instructions stored in the memory element 42 to generate the flow value 26 and the uncertainty value 28. The flow value 26 and the uncertainty value 28 are sent to downstream devices by way of the communications port 44 as indicated by arrow 35 and arrow 37, respectively.

Figure 4:
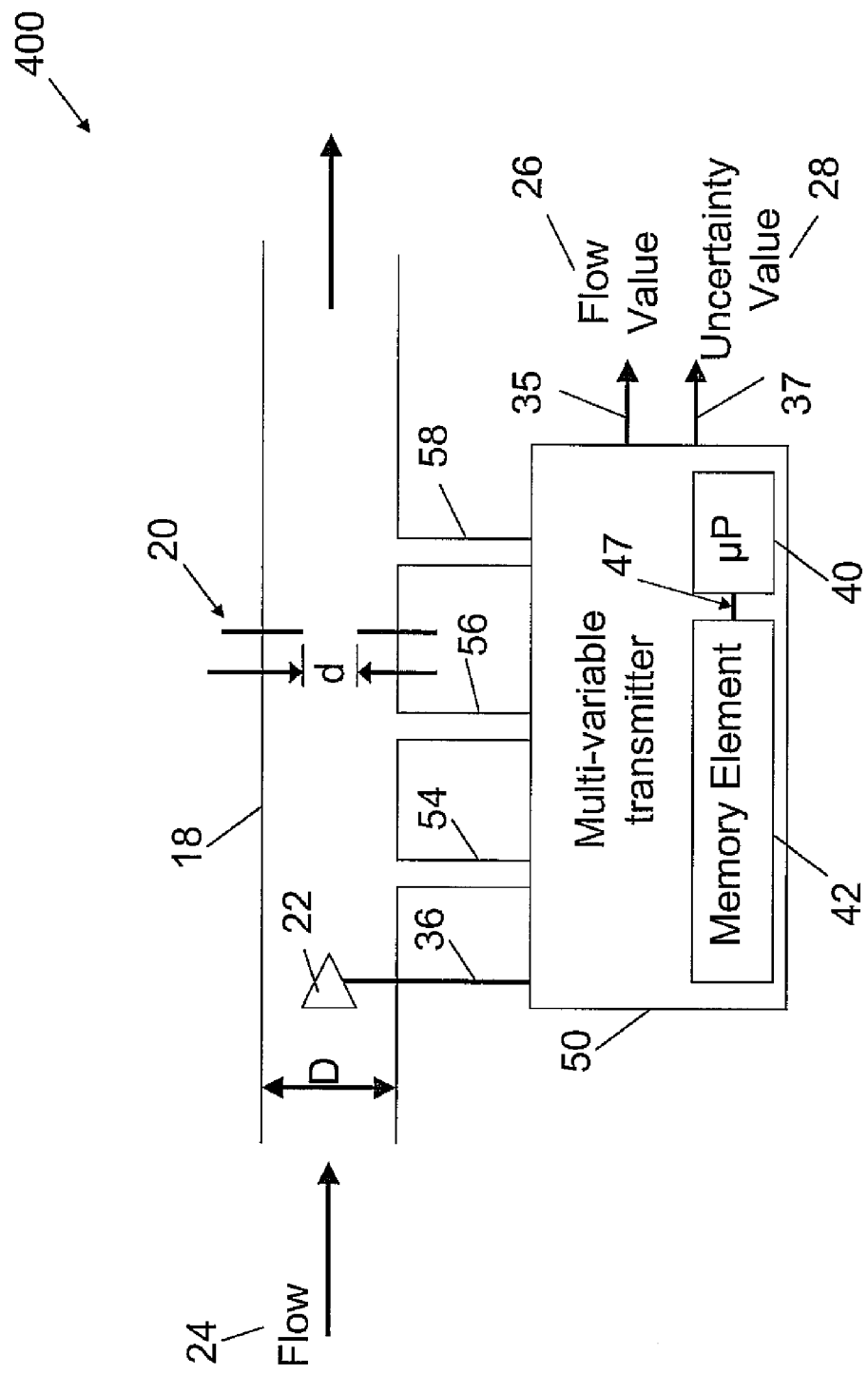
FIG. 4 illustrates a system in accordance with embodiments of the invention utilizing a multi-variable transmitter.

FIG. 4 illustrates alternative embodiments of a flow measurement system 400 for determining the flow value 26 and the uncertainty value 28. The illustrative flow measurement system 400 comprises a multi-variable transmitter 50 and the orifice plate 20 having an orifice diameter "d" disposed within the conduit 18 having a diameter "D". Additionally, the multi-variable transmitter 50 comprises the microprocessor 40 and the memory element 42 electrically coupled to each other by the system bus 47. The orifice plate 20 may be of varying types such as concentric, eccentric, and segmental.

As the flow 24 passes through the orifice plate 20, there is a resultant drop in fluid pressure and a corresponding increase in fluid velocity. In the embodiments of FIG. 4, the difference in pressure on opposing sides of the orifice plate 20 is measured by the multi-variable transmitter 50 that is in fluid communication with the conduit 18 through taps or inlets 56 and 58. FIG. 4 further illustrates a tap or inlet 54 that is in fluid communication with the conduit 18 upstream of the orifice plate 20 for measurement of the pressure upstream of the orifice plate 20. In alternative embodiments, the multi-variable transmitter 50 uses the same tap or inlet for both the differential pressure measurement and the upstream static pressure measurement. The temperature sensor 22 is electrically coupled by way of the conductor 36 to the multi-variable transmitter 50 for measurement of the fluid temperature upstream of the orifice plate 20.

In addition to the parametric data collected by the multi-variable transmitter 50, the multi-variable transmitter 50 also generates accuracy values associated with the parametric data. The microprocessor 40, in electrical communication with the memory element 42, utilizes the parametric data and accuracy values in the execution of instructions stored in the memory element 42 to generate the flow value 26 and the uncertainty value 28.

Figure 5:
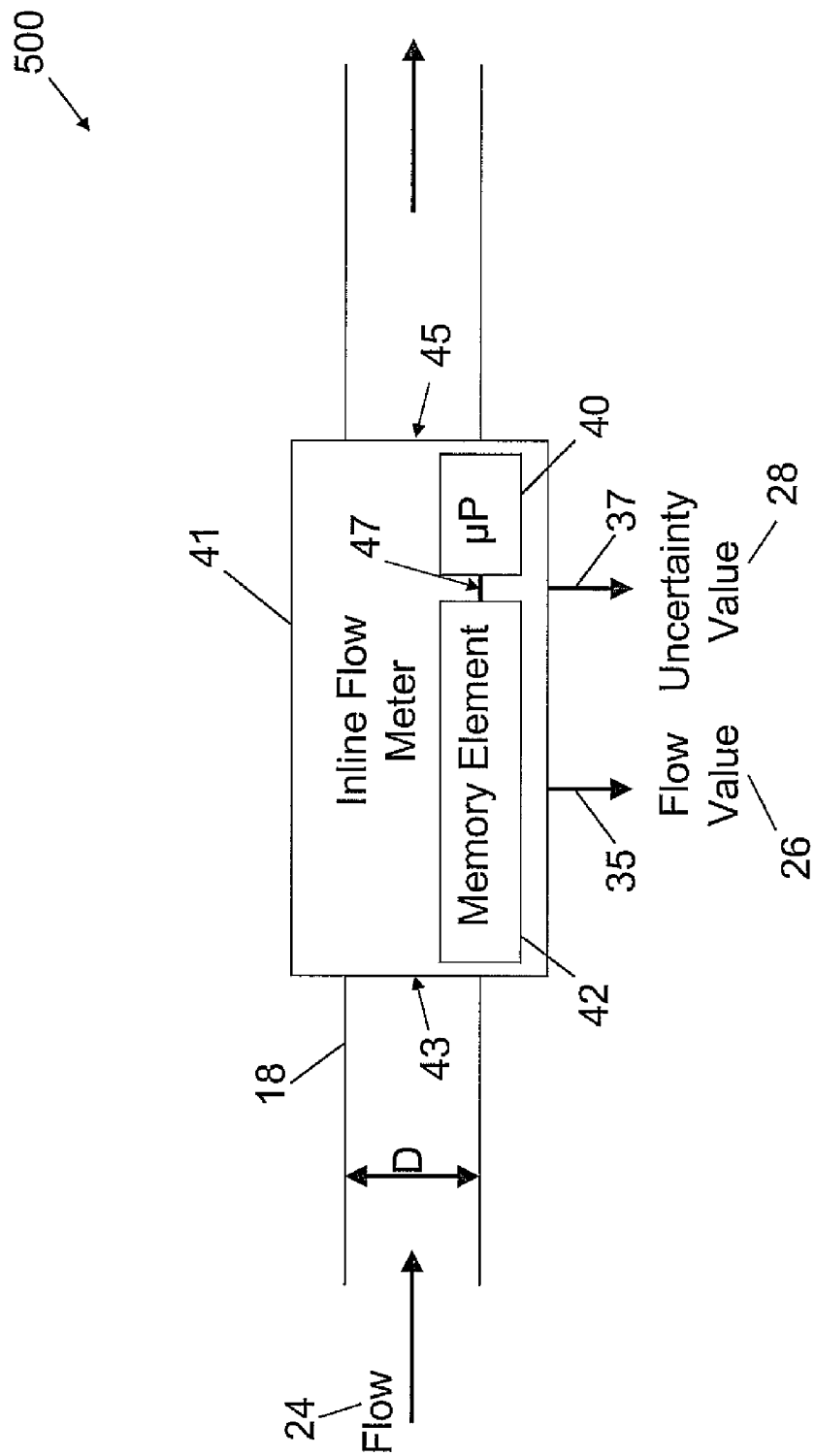
FIG. 5 illustrates a system in accordance with embodiments of the invention utilizing an inline flow meter.

FIG. 5 illustrates yet still further alternative embodiments of a flow measurement system 500 for measuring the flow value 26 and the uncertainty value 28. The flow measurement system 500 comprises the inline flow meter 41. Additionally, the inline flow meter 41 comprises the microprocessor 40 and the memory element 42 electrically coupled to each other by way of the system bus 47. The inline flow meter 41 comprises a coriolis meter, an ultrasonic meter, or a turbine meter, among others. The inline flow meter 41 is positioned such that the fluid flow in the conduit 18 flows through the inline flow meter 41. The inline flow meter 41 collects parametric data such as volume flow rate, flow velocity, and mass flow rate and the inline flow meter 41 also generates accuracy values associated with the parametric data. In accordance with embodiments of the invention, the inline flow meter 41 uses real-time parametric data and real-time accuracy values to calculate the real-time flow value 26 and the real-time uncertainty value 28.

Figure 6:
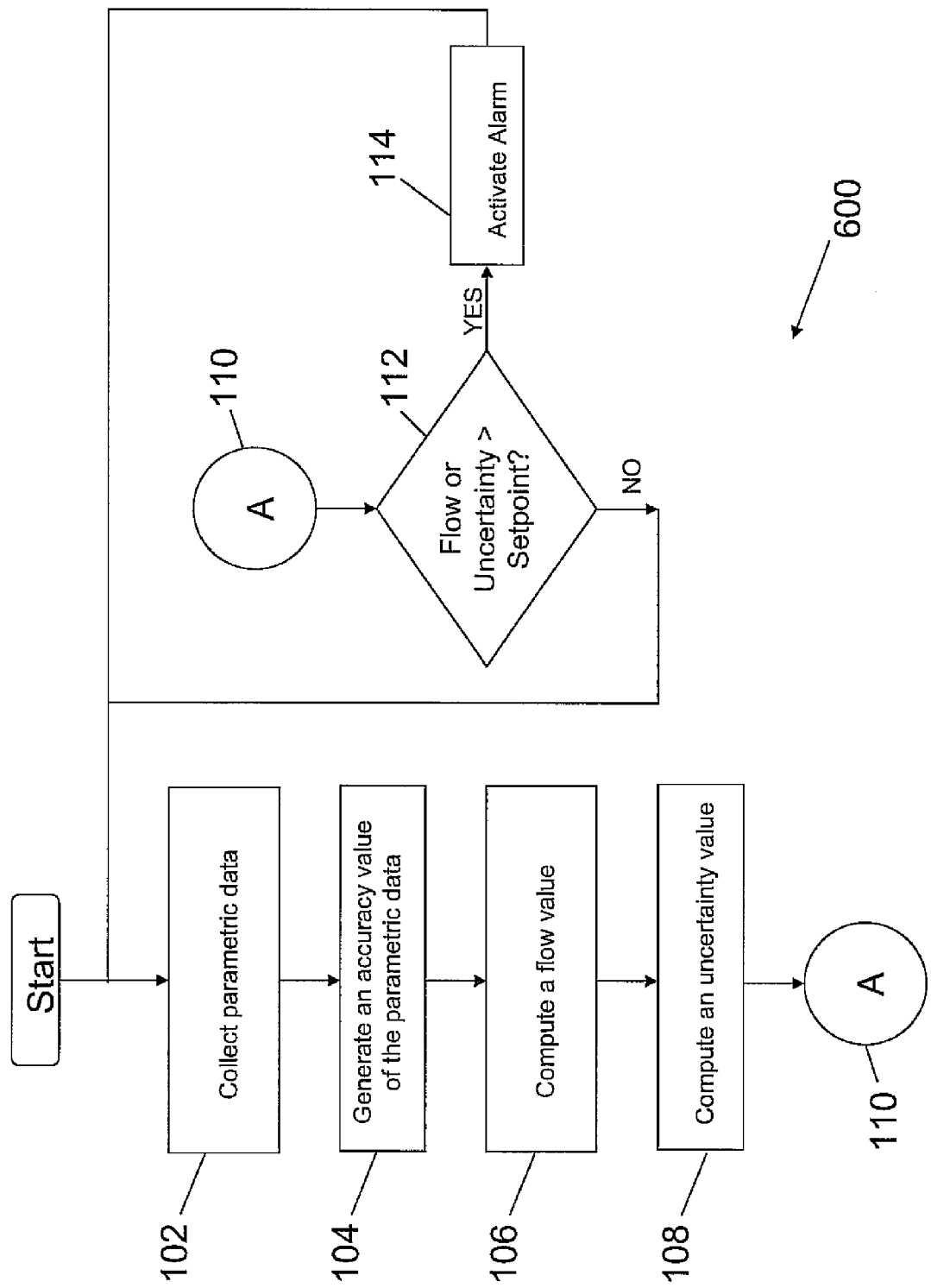
FIG. 6 shows an exemplary flow diagram for determining a flow value and an uncertainty value.

FIG. 6 illustrates a flow diagram for an algorithm used for generating the real-time uncertainty value 28 in accordance with embodiments of the invention. The flow diagram of FIG. 6 is merely illustrative, as the various steps may be combined, separated, or performed in a different order without departing from the scope and spirit of the disclosure. The process starts (block 100) and proceeds to the collection of parametric data (block 102). The parametric data may be collected, for example, by the temperature transmitter 10, the pressure transmitter 12, the differential pressure transmitter 14, the inline flow meter 41, or the multi-variable transmitter 50. The process then proceeds to generating the accuracy value of the collected parametric data (block 104), the generating possibly within the transmitter or flow meter. After the generation of the accuracy value, the flow value 26 is computed (block 106). In the embodiments as illustrated in FIG. 1 and FIG. 2, the parametric data and accuracy value are sent to the flow computer 16 for computation of the flow value 26. In the embodiments as illustrated in FIG. 4 and FIG. 5, the parametric data and accuracy value remain with the multi-variable transmitter 50 or inline flow meter 41 for internal computation of the flow value 26. The process proceeds to the computation of the uncertainty value 28 of the flow value 26 (block 108). In the embodiments illustrated in FIG. 1 and FIG. 2, the parametric data and accuracy value are sent to the flow computer 16 for computation of the uncertainty value 28. In the embodiments as illustrated in FIG. 4 and FIG. 5, the parametric data and accuracy value remain within the multi-variable transmitter 50 or inline flow meter 41 for internal computation of the uncertainty value 28. If the computed uncertainty value 28 is greater than some user-defined setpoint (block 112), then an alarm may be activated (block 114). Otherwise, the process proceeds with the further collection of parametric data (block 102). Also, the computed flow and uncertainty values may be archived and trended over time. In accordance with embodiments as illustrated in FIG. 6, real-time parametric data is collected and the associated real-time accuracy values are generated in order to calculate real-time flow values and real-time uncertainty values.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system comprising:
   a device in fluid communication with a conduit, the device configured to collect parametric data regarding fluid flow through the conduit, and the device configured to generate an accuracy value of the parametric data; and
   a flow computer electrically coupled to the device, the flow computer configured to receive the parametric data and the accuracy value from the device;

the flow computer is configured to generate a flow value using the parametric data; and the flow computer is configured to generate an uncertainty value of the flow value using the parametric data and the accuracy value received from the device.

2. The system as defined in claim 1 further comprising:

an orifice plate disposed within the conduit;

the device further comprises a differential pressure transmitter having a first inlet and a second inlet, the first inlet in fluid communication with the conduit upstream of the orifice plate, and the second inlet in fluid communication with the conduit downstream of the orifice plate;

the parametric data is indicative of the differential pressure across the orifice plate caused by fluid flow.

3. The system as defined in claim 2 further comprising:

a pressure transmitter in fluid communication with the conduit upstream of the orifice plate, the pressure transmitter is configured to generate pressure data indicative of pressure upstream of the orifice plate, and the pressure transmitter is also configured to generate an accuracy value of the pressure data;

the flow computer is configured to generate the flow value based on the parametric data and the pressure data; and the flow computer is configured to generate the uncertainty value using the accuracy value of the pressure data.

4. The system as defined in claim 1 wherein the device is a pressure transmitter in fluid communication with the conduit upstream of an orifice plate.

5. The system as defined in claim 1 wherein the device is a temperature transmitter with a temperature sensor configured to measure the temperature of the fluid upstream of the orifice plate.

6. The system as define in claim 1 wherein the device is a flow meter selected from a group comprising: an ultrasonic meter; a turbine meter; and a coriolis meter.

7. The system as defined in claim 1 wherein the flow computer is configured to provide diagnostic information regarding the overall system accuracy and regarding the device accuracy.

8. A method comprising:

collecting parametric data indicative of differential pressure across an orifice caused by fluid flow within a conduit and indicative of pressure of a fluid upstream of the orifice;

generating a first accuracy value indicative of the measurement accuracy of the differential pressure, and generating a second accuracy value indicative of the measurement accuracy of the pressure of the fluid upstream of the orifice;

computing a flow value using the parametric data; and computing a value indicative of the uncertainty of the flow value using the first and second accuracy values.

9. The method as defined in claim 8 wherein computing the flow value and computing the value indicative of the uncertainty further comprises computing and by way of a flow computer.

10. The method as defined in claim 8 further comprising chronicling the uncertainty value for comparison to a predetermined condition.

11. The method as defined in claim 8 further comprising generating an alarm based on the uncertainty value and on a user defined setpoint.

12. A flow computer comprising:

a processor;

a memory electrically coupled to the processor; and a communications port electrically coupled to the processor, the communications port configured to receive parametric data indicative of fluid flow and a value indicative of the accuracy of the parametric data;

the processor is configured to generate a flow value using the parametric data; and the processor is configured to generate an uncertainty value of the flow value using the parametric data and the value indicative of the accuracy of the parametric data.

13. The flow computer as defined in claim 12 wherein the communications port is configured to receive the parametric data from a transmitter selected from a group comprising: a differential pressure transmitter; a pressure transmitter; and a temperature transmitter.

14. The flow computer as defined in claim 12 wherein the communications port is configured to receive the parametric data from a flow meter selected from a group comprising: an ultrasonic meter; a turbine meter; and a coriolis meter.

15. The flow computer as defined in claim 12 wherein the processor is configured to provide diagnostic information regarding the flow computer accuracy.

16. A system comprising:

a device in fluid communication with a conduit, the device configured to collect parametric data regarding fluid flow through the conduit, and the device configured to generate an accuracy value of the parametric data;

the device is configured to generate a flow value using the parametric data;

the device is configured to generate an uncertainty value of the flow value using the parametric data and on the accuracy value; and the device is configured to provide diagnostic information regarding the overall system accuracy and regarding the device accuracy.

17. The system as defined in claim 16 further comprising an orifice plate disposed within the conduit, and wherein the device is a transmitter, the transmitter in fluid communication with the conduit.

18. The system as define in claim 16 wherein the device is a flow meter selected from a group comprising an ultrasonic meter, a turbine meter, and a coriolis meter, the flow meter in fluid communication with the conduit.

* * * * *